May 17, 1955 — R. Z. HAGUE ET AL — 2,708,427
CONTROL DEVICES AND SYSTEMS
Original Filed May 29, 1945 — 4 Sheets-Sheet 1

INVENTORS
Howard A. Alexanderson
Robert Z. Hague
BY
Herbert L. Davis
ATTORNEY

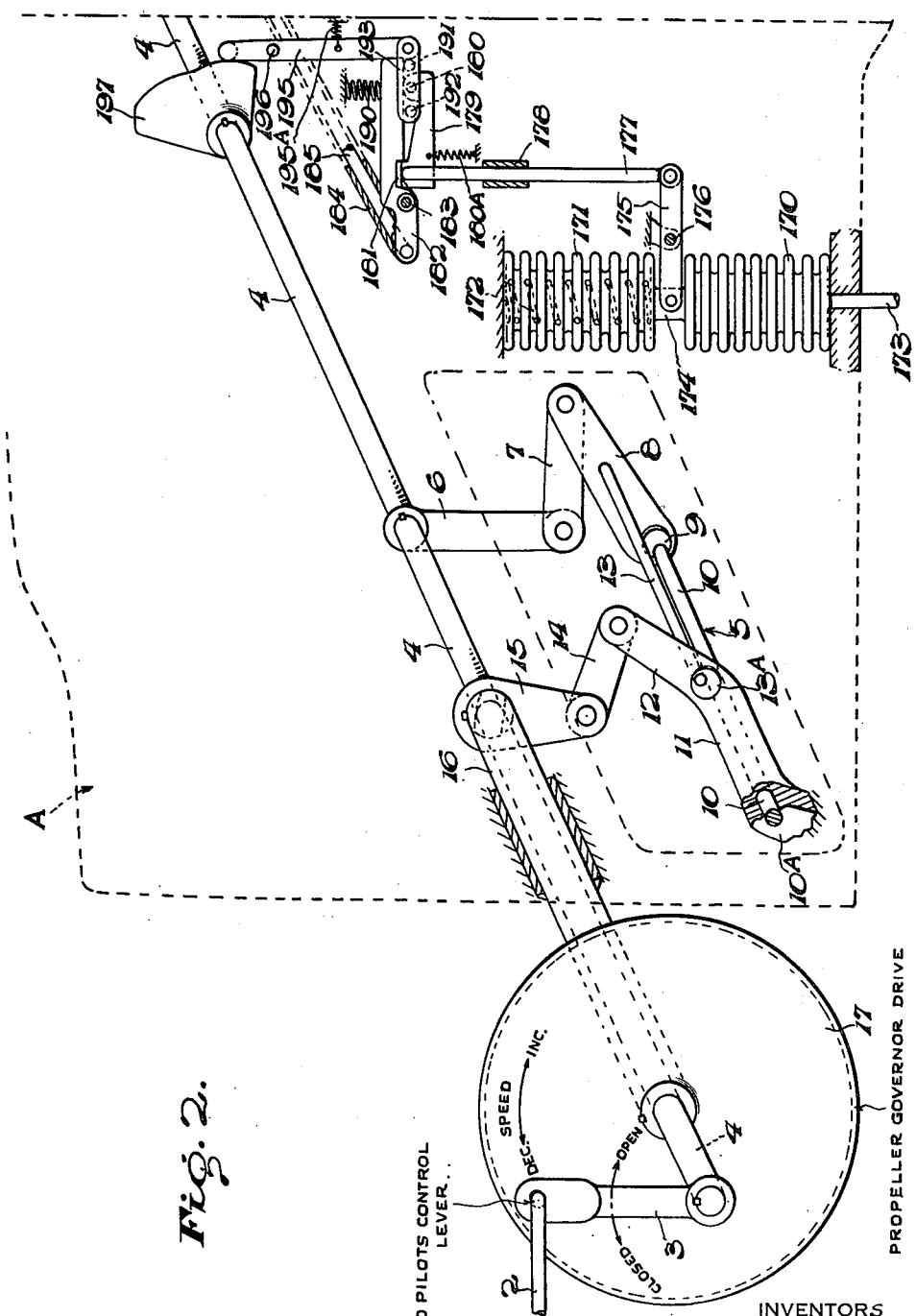

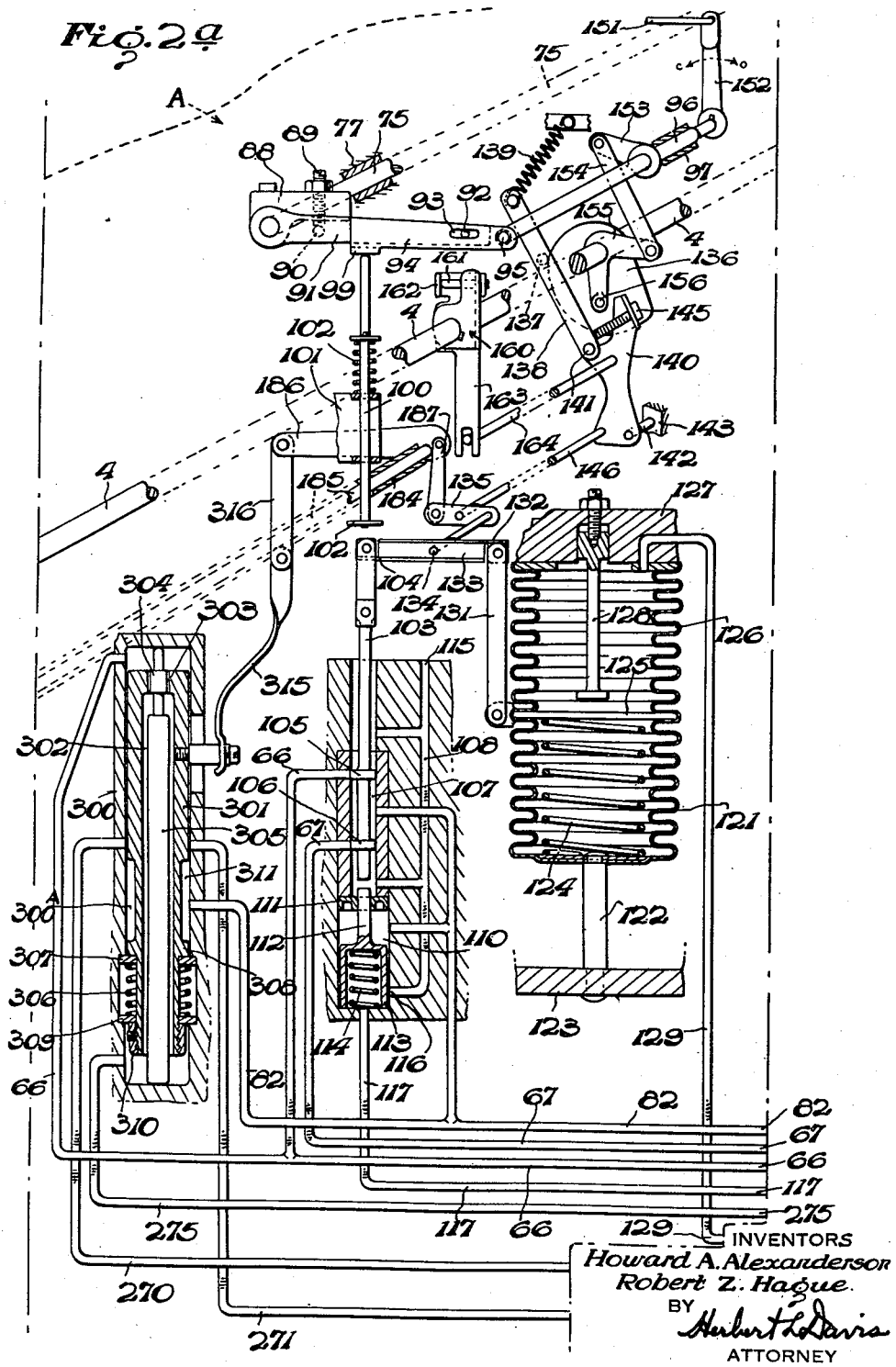

May 17, 1955

R. Z. HAGUE ET AL 2,708,427

CONTROL DEVICES AND SYSTEMS

Original Filed May 29, 1945

INVENTORS
Howard A. Alexanderson
Robert Z. Hague.
BY
Herbert L. Davis
ATTORNEY

United States Patent Office 2,708,427
Patented May 17, 1955

2,708,427

CONTROL DEVICES AND SYSTEMS

Robert Z. Hague, Oradell, N. J., and Howard A. Alexanderson, Holland Patent, N. Y., assignors to Bendix Aviation Corporation, Teterboro, N. J., a corporation of New Jersey Original application May 29, 1945, Serial No. 596,472, now Patent No. 2,678,642, dated May 18, 1954. Divided and this application May 17, 1954, Serial No. 430,333

33 Claims. (Cl. 123—103)

The present application is a division of U. S. application Serial No. 596,472, filed May 29, 1945, by Howard A. Alexanderson and Robert Z. Hague, now Patent No. 2,678,642, granted May 18, 1954.

An object of the invention is to provide a novel altitude droop mechanism for operation in a single stage supercharger system such as disclosed in the present application (where no inter-cooling is provided) to prevent detonation at high altitude due to high mixture temperatures by reducing the selected manifold pressure with increase in altitude to within a safe operating range.

Another object of the present invention is to provide a novel atmospheric pressure responsive means for effecting a decrease in the selected intake manifold pressure upon increase in altitude so as to prevent such pressure medium from having an excessive temperature at high altitudes, and a novel mechanism for adjusting the amount of such correction in accordance with the selected pressure.

Another object of the invention is to provide a novel altitude droop mechanism to limit the intake manifold pressure to values required for safe operation of an aircraft engine.

Another object of the invention is to provide novel means for effecting sequential control of a supercharger from a low speed hydraulic drive to a high speed hydraulic drive.

Another object of the invention is to provide a novel reducing valve and shuttle valve arrangement to selectively connect a source of fluid pressure to one or the other of a plurality of hydraulic couplings of a variable speed drive for a supercharger.

Another object of the invention is to provide a novel regulator for the air intake system of an aircraft engine including first means sensitive to the intake pressure, second means sensitive to the atmospheric or scoop pressure at the inlet to the system and a pressure which tends to vary with changes in altitude, and a third means sensitive to a pressure which varies with the pressure of a hydraulic coupling fluid for controlling the speed of a supercharger supplying air to the intake system, said first, second and third means being operatively connected to control a servomotor means for regulating the air intake system of the engine.

Another object of the invention is to provide a novel mechanical linkage arrangement for operatively connecting the first, second, and third pressure responsive means aforenoted so as to control the servomotor means for regulating the air intake system of the engine.

Another object of the present invention is to provide a novel and improved control mechanism for an aircraft engine which provides means for effecting simultaneously selection of engine R. P. M. and selection of the intake manifold pressure of an internal combustion engine, and novel means for modifying the relationship between engine R. P. M. and manifold pressure in the cruising power ranges for best fuel economy.

As in the copending application Serial No. 581,878, filed March 9, 1945, by Howard A. Alexanderson and Harold A. Wheeler, it is an object of the present invention to provide novel means controlled by the pilot for modifying the power schedule corresponding to the position of a main control member without changing the setting of the main control member.

Another object of the invention is to provide a pilot operated auxiliary control member movable in one direction from a normal position to increase one of the power output factors to a value above the normal schedule and movable in the opposite direction from a normal position to decrease the power output factor to a value below the normal schedule while the main pilot operated control member remains in a set position, and to further provide means actuated by the movement of the main control member to certain high or low setting positions for varying the effect of the auxiliary control member.

Another object of the invention is to provide a novel linkage arrangement including a bell crank lever operated by the auxiliary control member upon movement in one direction to affect the cam follower of a main control cam in a sense to increase one power output factor relative to the normal schedule and upon movement in an opposite direction to affect the cam follower in an opposite sense to decrease such power output factor relative to the normal schedule.

Another object of the invention is to provide a main control shaft for the cam including a lever means arranged so that upon the control shaft being rotated to a certain position the cam follower is actuated through the lever means so as to vary the effect of the bell crank lever.

Another object of the invention is to provide a novel selector plate and a cam follower pivotally connected thereto and normally contacting the contour surface of a selector cam under the biasing force of a spring which also serves to bias the cam follower into normal contacting relation with the selector plate in which the cam follower is arranged for adjustment out of contacting relation with the cam to vary a selected regulated value in one sense and in which the selector plate is arranged for adjustment out of contacting relation with the cam follower to vary the selected regulated value in an opposite sense.

A further object of the invention is to provide a main control shaft for the cam including means actuated upon rotation of the shaft in one sense for moving the selector plate out of contacting relation with the cam follower upon adjustment of the main control shaft to a certain position.

The above and other objects and features of the invention will appear more fully hereinafter from a consideration of the following description taken in connection with the accompanying drawings, wherein one embodiment of the invention is illustrated by way of example.

In the drawings, wherein like reference characters refer to like parts throughout the several views:

Fig. 2 is a diagrammatic view of part of the control mechanism shown in Fig. 1;

Fig. 2a is a diagrammatic view of a second part of the control mechanism; and

Figure 1:
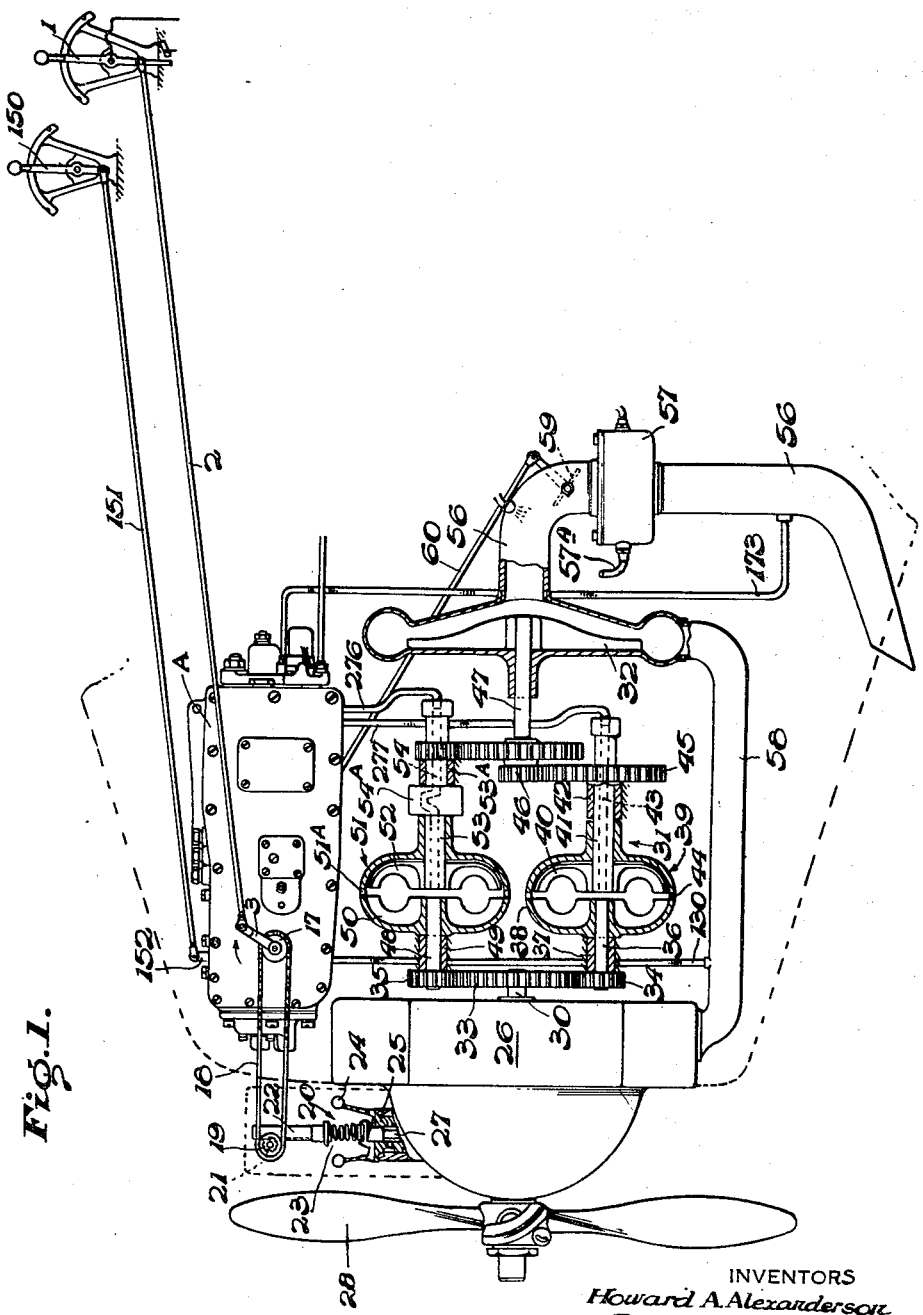
Fig. 1 is a diagrammatic view of the novel engine control system.

Referring to the drawings there is provided in the present invention a main pilot's control lever 1, which is connected by a link 2 to an operative control lever 3. As shown in Fig. 2, the control lever 3 is keyed to a main control shaft 4 which extends into the main control unit indicated in Fig. 1 by the letter A and shown diagrammatically in Fig. 2.

Driven by shaft 4 is a propeller pitch governor selector mechanism indicated generally by numeral 5 and including an arm 6 keyed at one end to the shaft 4 and pivotally connected by a link 7 to an arm 8 rotatably mounted on a shaft 9 eccentrically affixed to one end of an adjustable pin 10. The pin 10 is mounted in a casing of the unit A part of which is shown at 10A.

There is further rotatably mounted on the pin 10 an arm 11. The arm 11 is bent at an acute angle at 12 and pivotally connected to one end of a link 14. The arm 11 is connected to arm 8 by an idler shaft 13. The idler shaft 13 extends from points intermediate the opposite ends of arms 11 and 8 and is affixed eccentrically to a cam 13A rotatably mounted in arm 11.

The other end of link 14 is connected to an arm 15 which is keyed to one end of a tubular sleeve 16 rotatably mounted on the shaft 4. The opposite end of the sleeve 16 is keyed to a pulley 17 which, as shown in Fig. 2, is drivingly connected through lines 18 to an operating pulley 19 for adjusting a propeller pitch governor control indicated generally by the numeral 20.

The latter propeller pitch governor control may be of a suitable type well known in the art. The same is shown in Figure 1 as being of a type having the operating pulley 19 mechanically connected to a gear 21 and rack 22 for adjusting a governor spring 23 and fly-weight governors 24. The fly-weights 24 are pivotally mounted at one end of a shaft 23 drivingly connected through suitable gear means (not shown) to a drive shaft of an aircraft engine indicated by the numeral 26.

Slidably mounted in the shaft 25 is a valve 27 of conventional type, adjustably positioned under tension of the spring 23 and the counteracting biasing force of the centrifugally actuated fly-weights 24. The valve 27 is arranged to control the operation of a piston not shown which controls the pitch of a propeller 28 driven by the engine 26 in a manner well known in the art.

Thus the engine speed or R. P. M. of the engine 26 may be adjusted by varying through the pulley line 18 the tension of the governor spring 23 and the resultant position of the pilot valve 27. Moreover, through the propeller pitch selector mechanism indicated by numeral 5 the relationship of pilot's control lever 1 travel to propeller pitch governor drive travel may be modified by adjustment of the eccentric pin 10 to accommodate production variations in the angular travel of propeller governors 20.

The engine 26 also drives through a shaft 30 and a two-speed hydraulic coupling 31 a supercharger 32.

The coupling 31 includes a gear 33 keyed to the shaft 30 and driving high speed coupling gear 34 and low speed coupling gear 35.

The high speed coupling gear 34 drives through a shaft 36 rotatably supported by a bearing 37 one set of blades 38 of a hydraulic coupling 39 of conventional type. The opposite cooperating blades 40 of the coupling 38 are fastened to a driven shaft 41 rotatably supported by a bearing 42. The shaft 41 has a fluid inlet passage 43 leading into the coupling 39 for a purpose to be explained hereinafter. There is further provided in the fluid coupling 39 a fluid outlet port 44 through which the hydraulic fluid may be returned from the coupling 39 to a suitable sump, not shown.

Keyed to the driven shaft 41 is a high speed gear 45 which drives through gear 46 the drive shaft 47 of the supercharger 32.

The low speed coupling gear 35 drives through a shaft 48 rotatably supported by a bearing 49 one set of blades 50 of a hydraulic coupling 51 of similar type to coupling 44 and having fluid outlet ports 51A. The opposite cooperating blades 52 of the coupling 51 are fastened to a driven shaft 53 rotatably supported by a bearing 53A. The shaft 53 has a fluid inlet passage 54 leading into the coupling 51. The latter passage is controlled by a valve 54A of a type arranged so that when the driven shaft 53 rotates at a speed greater than the driving shaft 48, the passage 54 is closed for a purpose which will be described hereinafter. The coupling and valve may be of a type described and claimed in U. S. Patent No. 2,400,307, granted May 14, 1946, to L. S. Hobbs et al. and assigned to United Aircraft Corporation.

A conduit 56 leads from an airscoop through a carburetor 57 into the air inlet for the supercharger 32. As shown schematically in Fig. 1, there is connected to the carburetor 57 a conduit 57A leading from a suitable source of liquid fuel for the aircraft engine. A conduit 58 leads from the air outlet of the supercharger 32 to the intake manifold of the engine 26. A throttle valve 59 controls the air inlet conduit 56.

Figure 2B:
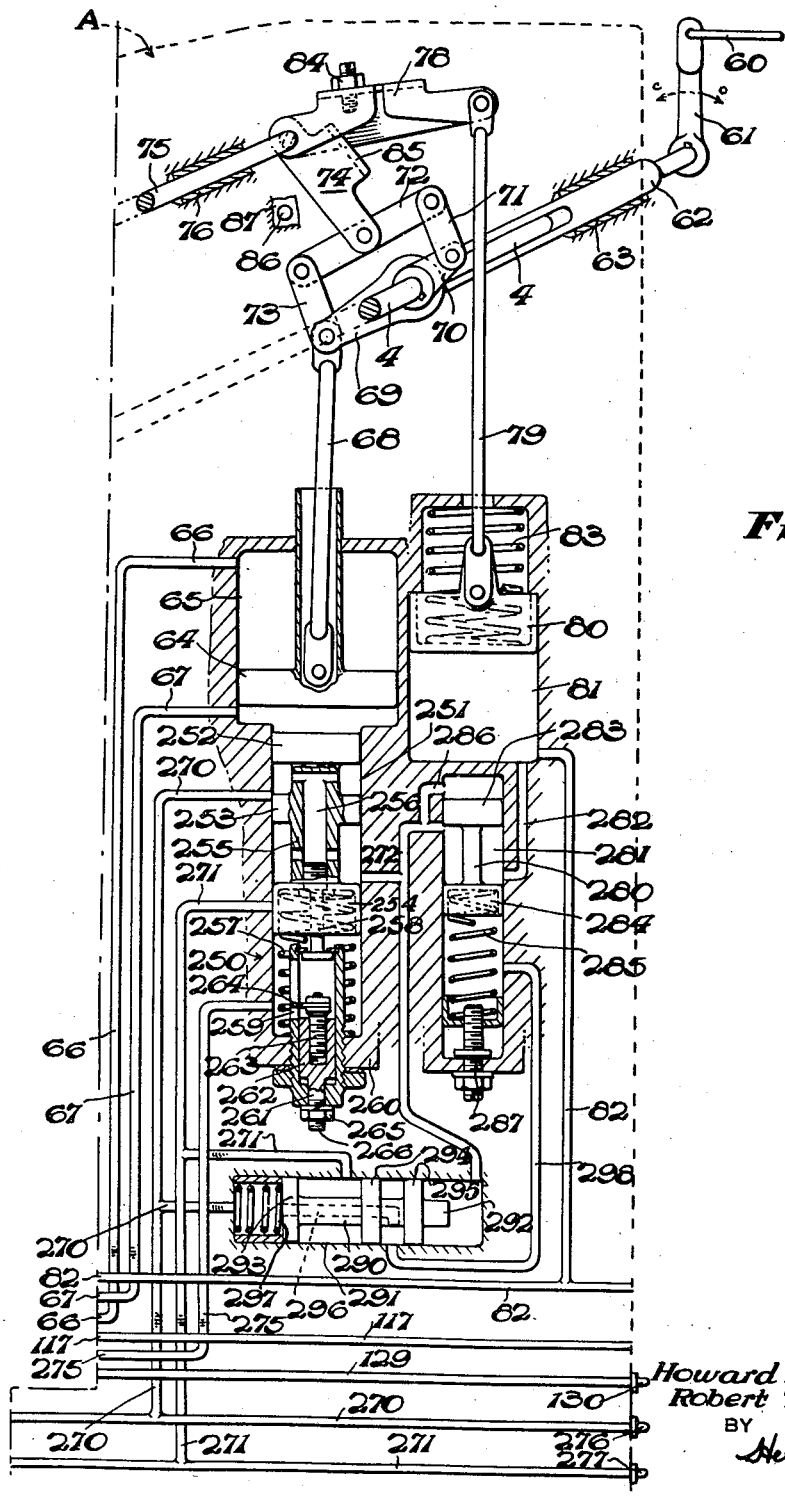
Fig. 2b is a diagrammatic view of a third part of the control mechanism.

The throttle valve 59 is controlled by a rod 60 operably connected, as shown in Fig. 2b, to a throttle control arm 61. The throttle control arm 61 is keyed to a shaft 62 rotatably mounted in a bearing formed in the casing of the control unit as indicated at 63. Rotatably mounted in the shaft 62 is one end of the shaft 4.

There is provided a servo piston 64 for operating the throttle 59 through shaft 62. The piston 64 is slidably mounted in a cylinder 65 having fluid pressure inlet passages 66 and 67 opening at opposite sides of the piston 64.

The piston 64 has a piston rod 68 pivotally connected at one end to the piston 64 and at the opposite end pivotally connected to an operating arm 69 formed integral with the rod 62.

Keyed to the pilot's control shaft 4 is a second arm 70 connected through a link 71 to one end of a walking beam 72. The opposite end of the walking beam 72 is connected through a link 73 to the arm 69.

Pivotally connected at a point intermediate the opposite ends of the walking beam 72 is one end of a lever arm 74 which is affixed at the opposite end to a shaft 75.

The shaft 75 is rotatably supported in bearing portions 76 and 77 formed apart of the control unit. Freely rotatable on the shaft 75 is an arm 78. The arm 78 is pivotally connected at the free end to a rod 79 which connects the arm 78 to a piston 80. The latter piston 80 is slidably mounted in a cylinder 81 into which opens at one end a passage 82 leading to a fluid pressure line such as oil under engine pressure. The piston 80 is normally forced under pressure of the oil in an upward direction as viewed in Fig. 2b.

A spring 83 is positioned between the piston and the upper end of the cylinder so as to force the piston in a downward direction upon oil pressure failure, whereupon the arm 78 is forced in a clockwise direction. An adjustable screw 84 projects through the arm 78 and is arranged so as to engage an abutment plate 85 on the arm 74 in the latter event so as to restrain movement of the arm 74 in a counterclockwise direction. A stop pin 86 projects from a portion 87 of the casing of the unit so as to restrain the arm 74 from movement in an opposite direction.

The pilot's control lever may then effect manual control of the throttle valve 59 through shaft 4, arm 70, link 71, walking beam 72, link 73, arm 69 and throttle control shaft 62.

The adjustable screw 84 is preferably adjusted so as to permit a small amount of angular travel of lever 74 between screw 84 and stop pin 86. During such manual operation of the throttle 59, lever arm 74 is driven between its restraining stops 84 and 86 rotating shaft 75.

The feature of the manually operable linkage thus described is disclosed and claimed in Reissue U. S. Patent No. 23,490, granted May 20, 1952, to Howard A. Alexanderson and Robert Z. Hague and assisgned to Bendix Aviation Corporation.

At the opposite end of the shaft 75 there is affixed an arm 88 through which projects an adjustable screw 89. The screw 89 is arranged to engage a pin 90 which projects from an arm 91, supported on shaft 75. The arm 91 is freely rotatable on the shaft 75 and includes a second pin 92 which projects therefrom into a slot 93 formed in an arm 94 freely rotatable on a pin 95 projecting from one end of a shaft 96. The shaft 96 is rotatably supported in a bearing 97 formed apart of the casing of the control unit A.

The arm 94 has an abutment plate 99 which bears upon one end of a plunger 100 slidably supported by bracket portions 101 and biased in an upward direction by spring 102. Lever arm 94 is driven by pin 92 of arm 91 so as to move plunger 100.

The plunger 100 is arranged so as to operably contact at 102 one end of a valve steam 103 which is biased under force of a leaf spring 104 in an upward direction. The valve stem 103 has valve members 105 and 106 arranged so as to control passages 66 and 67 respectively opening into valve chamber 107 and leading to chamber 65 at opposite sides of piston 64 so as to control the movement of the piston 64. The fluid pressure line 82 opens intermediate the openings of passages 66 and 67 to valve chamber 107. A fluid medium outlet or drain passage 108 also opens from the valve chamber 107 at the upper and lower sides of valves 105 and 106, respectively.

Another valve chamber 110 is provided separated from the valve chamber 107 by a sealing member 111. Projecting through the sealing member 111 is a valve stem 112. At the lower end of the valve stem 112 is mounted a cylindrical valve 113 having a spring 114 which tends to bias the valve 113 and stem 112 in an upward direction.

The fluid pressure passage 82 opens into the valve chamber 110 at the upper side of the valve 113 so that during normal operation the fluid pressure medium forces the valve 113 downward into the position shown in Fig. 2a. The exhaust passage 108 has a port 115 opening into the housing of the control unit A and a port 116 opening into the chamber 110 but closed by the valve 113 when biased downward to the position shown in Fig. 2a. A main drain passage 117 opens into the valve chamber 110. During normal operation the fluid medium is drained from the housing by suitable ports not shown.

When no pressure medium is available, or upon oil pressure failure, the drain valve 113 which is loaded by spring 114 is moved in an upward direction under force of the spring 114 serving two purposes. It causes the oil in the housing of the control unit A to drain to a predetermined low level by uncovering a drain port 116 so as to permit such drainage through port 115, passage 108, port 116, valve chamber 110 and through passage 117 to the fluid outlet. Secondly the spring 114 urges valve stem 112 upward into contacting relation with the lower end of the valve stem 103 so as to actuate the valve stem 103 in an upward direction.

During such fluid pressure failure, movement of the pilot's control lever 1 so as to move arm 70 in a counterclockwise direction causes movement in a counterclockwise direction of the lever arm 74 between its restraining stops 86 and 84 whereupon valve stem 112 under force of spring 113 causes servo valve to move from its neutral position as shown in Fig. 2a, to an upper position so as to uncover the ports leading to passages 66 and 67 so as to permit movement of the throttle 59 manually. Similarly upon movement of the lever arm 74 in a clockwise direction between its restraining stops 85 and 86 as upon manual movement of arm 70 in a clockwise direction, lever arm 94 actuates through plunger 100 the valve stem 103 in a downward direction opening the ports to passages 66 and 67. It will be seen from the foregoing that the manual operation of the servo valve 103 not only permits the opening of the passage 65 and 67 so that the manual operation of arm 69 and accordingly throttle 59 may be effected, but in the event slight pressure be available, such movement of the valve 103 directs such slight pressure so as to affect piston 64 so as to assist the manual movement of the arm 69 and thereby assist in the manual control of throttle valve 59.

The latter feature of effecting manual control of the position of the throttle upon pressure failure is described and claimed in Patent No. 2,678,642.

Automatic control of throttle

When fluid pressure is available in excess of a predetermined value, the piston 80 is moved upward under the pressure medium from passage 82 against the force of spring 83. This latter action forces link 79 upward moving lever 78 in a counterclockwise direction so as to permit lever arm 74 to move free of the restraining screw 84. Likewise upon such fluid pressure medium becoming effective, the valve 113 is moved downward against spring 114 permitting the servo valve 103 to move free of the valve stem 112 under automatic control.

In order to effect the latter automatic control there is provided a pressure responsive bellows assembly including an evacuated bellows 121 supported at one end by a stud 122 carried by a portion 123 of the control unit A.

A spring 124 is positioned within the evacuated bellows 121 tending to expand the same. At the opposite end of the bellows 121 there is provided a movable plate 125 interposed between the bellows 121 and a second bellows 126. The bellows 126 is mounted at the opposite end by a portion 127 of the control unit A. An adjustable pin 128 projects into the bellows 126 from the portion 127 so as to limit the extent of contraction of the bellows 126 for a purpose which will be described hereinafter.

A passage 129 formed in the control units leads from the interior of the bellows 126 to a conduit 130, shown in Fig. 2b. The conduit 130, as shown in Fig. 1, leads to the air intake manifold conduit 58. Thus the bellows 126 is controlled by the intake manifold pressure of the engine 26.

The movable plate 125 between the manifold pressure bellows 126 and evacuated bellows 121 is connected through a link 131, leaf spring 132, beam 133 and the leaf spring 104 to the servo valve 103. Beam 133 in the schematic drawing of Fig. 2a contains at opposite ends the preloaded leaf springs 104 and 132 which permit deflection of the servo valve 103 by plunger 100 and valve stem 112 without excessively loading the bellows assembly. The beam 133 may, however, be made in the form of a solid beam and link 131 provided with a preloading mechanism which maintains the link 131 at a fixed length.

The selected pressure or datum of the bellows assembly may be changed by moving a pin 134 on which beam 133 is pivotally supported. Pin 134 is adjusted through operation of a whiffle-tree type of beam 135 controlled through operation of a pressure selecting mechanism, a cruise override lever; a hydraulic follow-up mechanism; and an altitude droop mechanism as will be described hereinafter.

It will readily be seen, however, from the foregoing that upon an increase in the intake manifold pressure above the selected pressure, there will result an expansion of the manifold pressure bellows 126 causing the beam 133 to be shifted in a clockwise direction whereupon the servo valve 103 will be adjusted upward causing a pressure medium to be applied through the passage 66 to the upper side of the piston 64 and exhausting the lower side through passage 67. This action will cause the piston 64 to be adjusted downward so as to adjust the arm 69 in a counterclockwise direction so as to adjust the arm 61 in a counterclockwise direction moving valve 59 of Fig. 1 through rod 60 in a valve closing direction decreasing the intake manifold pressure until the valve 103 is returned to a neutral position. An opposite effect is, of course, produced upon the intake manifold pressure dropping below the selected value.

Pressure selecting mechanism

As shown in Fig. 2a, a pressure selector cam 136 is rigidly keyed to a pilot's control shaft 4. Contacting the contour of the selector cam 136 is a cam follower 137 projecting from a follower lever 138. The follower lever 138 is loaded by an extension spring 139 and pivotally mounted on a selector plate 140 at pin 141. The selector plate 140 is pivoted on a pin 142 which projects from a portion 143 of the control unit A. The spring 139 is fastened at one end to a suitable securing means so as to bias the lever 138 and cam follower 137 into contacting relation with the contour of the selector cam 136, as heretofore explained.

An adjusting screw 145 is mounted on the selector plate 140 and limits the clockwise rotation of lever 138. The selector plate 140 pivoted on the pin 142 transfers adjustment thereof to the whiffletree 135 through an interconnecting pin 146 projecting from plate 140 and upon which the whiffletree beam 135 is pivotally mounted. It will be readily seen from the foregoing that with spring 139 pivoting lever 138 at follower 137 in a clockwise direction into contacting relation with adjustment screw 145, the follower 77 and selector plate 140 act as a unit, and the pressure selection of cam 136 is transmitted to the bellows and valve linkage through pin 146, beam 135 and pin 134.

The manifold pressure bellows 126 is provided with the adjustable lock out stop pin 128 previously described. The latter pin 128 is adjusted to a low manifold pressure value below the minimum idling pressure for the engine 26, but above the minimum selected pressure. When pressures are selected by the pilot through operation of the control lever 1 which are less than the lock out setting pressure, the control unit A is locked into manual operation through the joint effect of the pins 128 and 134 causing the adjustment of the valve 103 upward tending to adjust the throttle valve 59 to a closed position. Thus through appropriate manual adjustment of the control lever 1, the throttle 59 may be manually controlled, as described and claimed in Patent No. 2,678,642. The latter lockout feature is described and claimed broadly in U. S. Patent No. 2,453,650, granted November 9, 1948, to Howard A. Alexanderson and assigned to Bendix Aviation Corporation. The lock out stop 128 also permits closing of the throttle 59 in the event of a broken evacuated bellows, since it provides means for placing the control unit into manual operation.

*Economy control*

The economy control feature claimed in the present application includes a pilot's economy control lever indicated in Fig. 1 by the numeral 150. The latter lever 150 is connected through a rod 151 to a control arm 152 keyed to the shaft 96 previously described and shown in Fig. 2a. Keyed to the shaft 96 is an arm 153 connected by link 154 to a bell crank 155 freely rotatable on the shaft 4.

The bell crank 155 has a stud 156 projecting therefrom and arranged so that when the economy control lever 150 is rotated so as to move the arm 152 in a counterclockwise direction to the "cruise" position, the economy bell crank 155 is rotated clockwise so that during operation in the cruising range of power, stud 156 will raise lever 138 increasing the selected pressure setting and stud 156 will replace follower 137 as the pivot for the lever 138.

As the pilot's control shaft 4 is rotated in a counterclockwise direction towards closed throttle, the cruise pressure setting must be reduced at an appropriate point and the pressure setting brought down to the normal selection. In order to effect the latter operation a collar 160 is keyed to the shaft 4 having an adjustable screw 161 arranged so as to contact an end 162 of a lever 163 freely rotatable on the shaft 164 so as to limit the rotation of lever 163 in a clockwise direction. Thus, as shaft 4 is rotated in a counterclockwise direction towards closed throttle, lever 163 is moved by screw 161 at a predetermined adjusted position of the shaft 4 in a counterclockwise direction so as to apply a load to the selector plate 140 through a pin 164 projecting from the plate 140. As the shaft 4 is adjusted further towards closed throttle position, the plate 140 is adjusted in a clockwise direction about the pivot pin 142 so as to effectively reduce the selected pressure as the control shaft 4 is rotated towards closed throttle position.

When economy control lever 152 is rotated clockwise to the magneto check position, stud 156 contacts an upper projection of selector plate 140, causing the selector plate 140 to move in a clockwise direction and effectively locking the pressure selection at a low value and maintaining the throttle at its minimum position for purposes of checking the magneto.

The economy control feature is claimed broadly in the copending application Serial No. 581,878, filed March 9, 1945, by Howard A. Alexanderson and Harold A. Wheeler, and assigned to Bendix Aviation Corporation.

*Altitude correction droop mechanism*

There is further provided an altitude correction device or droop mechanism shown in Fig. 2 and claimed in the present application. The altitude droop mechanism serves in the single stage supercharger system disclosed (where no intercooling is provided) to prevent detonation at high altitude due to high fuel mixture temperature. At sea level, a given supercharged intake manifold pressure may not cause detonation due to its relatively lower temperature, while at relatively higher altitudes the same supercharged intake manifold pressure may have a relatively higher temperature. The altitude droop mechanism reduces the selected manifold pressure with increase of altitude to within a safe operating range. Thus, at high selected manifold pressure, drooping in the selected intake manifold pressure is started at relatively low altitudes and the manifold pressure setting is decreased rapidly with change in altitude.

As lower manifold pressures are selected, drooping in the intake manifold pressure starts at a high altitude and occurs at a slower rate until at low manifold pressures no correction or droop is required and constant manifold pressure control is provided.

The foregoing operation is effected through a bellows assembly including an altitude bellows 170 opposed by an evacuated bellows 171 including an internal spring 172. The bellows 170 is connected through a conduit 173 to the atmospheric or scoop pressure at the inlet to the conduit 56 as shown in Fig. 1.

The position of the plate 174 between the bellows 170 and 171 is an indication of the prevailing atmosphere. This indication is tranmitted by a lever 175 pivotally supported at 176 and connected at one end to the plate 174 and at the opposite end to a plunger 177. The plunger 177 is slidably mounted in a supporting bearing 178 and is arranged so as to actuate a cam lever 179 pivoted at one end on a fixed pivot 180 and having a plate 181 at the opposite end upon which the free end of the plunger 177 bears. A spring 179A biases the cam lever 179 towards the plunger 177. The spring 179A in actual practice may be in the form of a torsion spring about the pin 180.

A second lever 182 is pivotally supported on a fixed pivot 183. At one end of the lever 182 there is provided a sleeve-like bearing 184 formed integral therewith and a pin 185 projecting through said bearing 184 and rotatably connected at one end to the lever 182.

The opposite end of the pin 185 is affixed to a follow-up lever 186 and transmits its motion to the selector whiffletree beam 135 through a link 187 pivotally connected at one end to the follow-up lever 186 and at the opposite end to the beam 135.

Lever 182 is spring loaded in a clockwise direction by a spring 190 which, in actual practice, may be in the form of a torsion spring about pin 183. The movement of the lever 182 in a clockwise direction is limited by a pin 191. The cam lever 179 transmits its motion to lever 182 through a pin 192 which is formed as an integral part of a link 193. The pin 192 may be adjusted along the surface of the cam lever 179 and between the levers 179 and 182 from a point coinciding with pivot pin 180 to a position at the left thereof. In the former position it will be readily seen that since the pin 192 of link 193 would be rotated at the pivot 180 of the cam lever 192 that motion of the altitude bellows could not transmit any motion to lever 182. However, as the pin 192 is adjusted to the left of pivot 180 correspondingly greater movement will be imparted to lever 182.

In order to effect the latter adjustment of the pin 192, the link 193 is pivotally connected to one end of a cam follower arm 195 pivoted on a fixed pin 196 and bearing at the opposite end upon the surface of a cam 197 keyed to the main control shaft. 4 under the biasing force of a spring 195A which in actual practice may be in the form of a torsion spring about the pin 196.

It will be seen from the foregoing that as the altitude correction cam 197 is rotated clockwise, the cam follower lever 193 is pivoted at pin 196 so as to move link 193 and accordingly pin 192 into a position where the adjustment of cam lever 179 can be transmitted to lever 182. The cam shape provided at the upper surface of cam lever 179 determines the altitude at which motion will be transmitted to the lever 182 for manifold pressure setting. The shape of the cam lever is so arranged that the greater the intake manifold pressure the lower the altitude at which correction is effected and that at very low pressure settings no altitude correction is effected.

*Supercharger speed control*

As the valve 103 is adjusted by the bellows assembly from its neutral position, there is effected a corresponding adjustment of the piston 64 shown in Fig. 2b. As the bellows calls for greater pressure, the piston 64 is adjusted upward until the throttle 59 has been adjusted to the fully open position. Piston 64 is of such a size that the same effectively overcomes all throttle loads at a predetermined fluid or oil pressure differential of, for example, 20 p. s. i. When the piston 64 has opened the throttle 59 fully, if the manifold pressure still remains less than the setting, the fluid pressure differential from passage 67 to 66 will rise above the predetermined pressure value.

A metering piston-valve 250 is provided slidably mounted in a piston chamber 251 opening at one end into the chamber 65 and so arranged that the fluid pressure medium applied to the piston 64 through passage 67 may be also applied to one side of a piston head 252. The piston valve 250 includes the valve members 253 and 254 and valve stem 255 connecting the same. A passage 256 extends through the valve stem 255 and opens at opposite sides of the valve members 253. A spring 257 biases the piston-valve assembly 250 upward. A pin 258 projects downward from the valve 254 and is slidably mounted in a sleeve member 259. The member 259 is screwthreadedly engaged in a portion 260 of the control unit A and is arranged so as to limit the upward movement of the piston valve 250. Mounted within the sleeve member 259 is a stem 261 having a nut portion 262 screwthreadedly engaging a screw 263 locked from rotation by a portion 264 engaged in the member 259. The stem 261 is engaged at the outer end by nuts 265 so that the same may be readily locked in adjusted position. There is formed in the outer end of the stem 261 a cleft 266 for adjustment purposes.

By appropriate adjustment of the member 259 and screw 263 the limits of movement of the piston valve 230 may be readily determined.

The valves 233 and 254 are arranged to open in sequence the passages 270 and 271 to pressure medium supplied the valve 250 through pressure conduit 272 as the pressure supplied the chamber 65 through passage 67 exceeds predetermined differential values above the pressure supplied the opposite end of the valve through a passage 275, which as will be later explained, equals the pressure in line 66.

The passage 270 opens into a conduit 276 which, as shown in Fig. 1, supplies fluid medium to the low speed coupling 51 through passage 54 and valve 54A. Similarly, the passage 271 opens into a conduit 277 so as to supply fluid medium to the high speed coupling 39 through passage 43.

The hydraulic couplings 51 and 29 serve to couple the driving member 30 to the driven member 47 at varying speed ratios depending upon the rate of fluid flow supplied to the individual coupling which thus determines the slippage of the coupling and its speed ratio.

The metering piston-valve 250 is adjustably positioned by the aforenoted differential pressure so as to properly control the coupling ratio and accordingly the driving speed of the supercharger 32 so as to maintain a preselected intake manifold pressure in the conduit 58 as controlled by the servo valve 103. By appropriate adjustment of the members 259 and 261 the minimum opening of the low speed passage 270 and the maximum opening of the high speed passage 271 may be conveniently adjusted.

In order to provide a substantially constant pressure in the passage 272 there is provided a reducing valve 280 including a valve chamber 281 having a pressure inlet passage 282 leading from the piston chamber 81 and opening in the chamber 281 at a point between parts 283 and 284 of the valve 280. A spring 285 biases the valve 280 in an upward direction tending to counterbalance the pressure applied at the upper end of valve 280 through a passage 286, while the valve portion 283 tends to open the passage 272 to the pressure medium as the valve 280 is biased upward by the spring 285 so as to increase the pressure applied through passage 286 to a predetermined constant value. The tension of spring 285 may be adjusted by means of a suitable adjusting mechanism 297 so as to vary the maximum flow through passage 270.

The aforenoted novel arrangement of the throttle piston 64 and coupling metering piston-valve 250 is described and claimed in Patent No. 2,678,642.

It has been found, however, that there is considerable variation in the back pressure in lines 270 and 271 thereby causing a metering error. The present application is directed to novel means to correct this condition in which there is provided a shuttle valve 290 to connect the pressure in the passage 270 to the lower end of the valve chamber 281 during low speed supercharger operation and the pressure in the passage 271 to the lower end of the valve chamber 281 during high speed supercharger operation. Thus as back pressure increases the valve 280 will tend to increase the opening of the passage 272 so as to compensate for such increase.

The shuttle valve 290 is slidably mounted in a valve chamber 291 and includes a stem portion 292 having valve portions 293, 294 and 295 mounted thereon in spaced relation. A passage 296 extends longitudinally in the stem. One end of the passage 296 opens through the end of the stem 292 into the chamber 291 while the opposite end opens through the side of the stem 292 into the space between the valve portions 294 and 295. The passage 270 opens into the valve chamber 291 at the left of the shuttle valve so that the pressure in the passage 270 together with the force of a spring 297 biases the shuttle valve in the chamber 291 towards the right. At the opposite end of the shuttle valve 290 the pressure passage 272 opens into the valve chamber so as to normally counterbalance the force exerted by the spring 297 and fluid medium from passage 270 and position the valve 290 as shown in Fig. 2b.

In the latter position, a passage 298 leading from the lower end of the valve chamber 281 opens into the valve chamber 291 between the valve members 294 and 295 so that the passage 270 is connected through passages 296 and 298 to the lower end of the reducing valve 280. There further opens into the valve chamber 291 the passage 271 which opens at a point between valve members 293 and 294 so that in the latter adjusted position of the throttle valve the passage 271 is disconnected from the valve 280.

However, when the pressure in passage 270 exceeds a predetermined value, the valve 290 is shifted to the left so as to close passage 296 to passage 298 and open passage 298 to passage 271 so as to shift the reference pressure for the reducing valve 280 from that in passage 270 to the pressure in passage 271.

After the pressure medium has been supplied, the high speed coupling 39 through passages 270 and 39 starts to over drive the low speed coupling 51, the low speed fluid feed line 54 is closed through operation of the rotary valve 54A permitting the coupling 51 to empty. Upon the rotary valve 54A closing the low speed pressure line 34, the pressure in passage 270 increases to a value sufficient to cause the shifting of the shuttle valve 290 previously described and the fluid pressure in the passage 270 maintains the shuttle valve 290 in the latter shifted position until such time as the high speed drive operation is terminated.

If desired, a separate throttling valve may be provided for each flow control port. In this way a constant differential can be provided at the metering port feeding passage 270 and similarly a constant pressure differential can be supplied across the port feeding passage 271. The throttling may be provided either by throttling the fluid medium entering the metering valve or by feeding engine oil pressure into the metering valve and throttling the flow through passage 270 or 271 as required. There is thus provided a constant pressure drop across the regulated discharge port of the metering valve 250.

*Follow-up mechanism*

When valve 250 is moved from one position to another, there is an elapse of time required to flow the fluid medium into the hydraulic coupling 39 or 51 to bring the coupling to the particular slip condition required, and for the supercharger to cause the intake manifold pressure to rise to the selected value. This time lag tends towards instability and in order to provide a stabilizing action, a follow-up mechanism 300, as shown in Fig. 2a, has been provided in the hydraulic circuit of the metering valve 250.

The follow-up mechanism 300 includes a valve chamber 300A in which there is slidably mounted an adjustable valve-piston 301. Extending longitudinally in the valve-piston 201 is a passage 302 having a valve opening 303 at the upper end.

The valve opening 303 is controlled by a valve member 304 mounted on a stem 305 extending longitudinally through the passage 302 and fixedly mounted at opposite ends of the valve chamber 301. There is provided a slight clearance between the defining surface of the valve opening 303 and the valve member 304 sufficient to permit a limited passage of the fluid medium or oil. The stem 305, as shown in Fig. 2a, is positioned in spaced relation to the inner surface of the passage 302 so as to permit passage of the pressure medium such as oil upon opening of the valve opening 303.

The follow-up valve-piston 301 is centered by the action of a spring 306 which bears at one end upon an annular plate 307 slidably mounted within a portion of the valve chamber and engaging a shoulder 308 formed on the valve 301. Movement of the plate 307 is limited by another shoulder formed within the valve chamber. The opposite end of the spring 306 bears upon a similar annular plate 390 slidably mounted within a portion of the valve chamber but similarly limited by a shoulder portion formed within the valve chamber. The plate 309 is engaged by a nut 310 provided at the lower end of the piston-valve 301. The annular plates 307 and 308 are slidably mounted on the piston valve 301 and are biased in opposite directions into engagement with the shoulder 308 and nut 310 respectively.

An annular recess 311 is formed in the piston-valve 300 and opening into the valve chamber 300A at a point adjacent the recess is the fluid pressure passage 82. Passages 270 and 271 also open into the valve chamber but are closed by the piston-valve 300 upon the same being positioned in the neutral position shown in Fig. 2a.

Opening at opposite ends of the valve chamber 300A are the passages 66 and 275. The passage 66 leads from the servo valve 103 while the passage 275 leads from the lower end of the metering valve 250 as previously explained.

The amount of follow-up action effected by the mechanism 300 is determined by the speed of movement of the metering valve 250, since the quantity of fluid medium or oil flowing through the lines 66 and 275 to and from the follow-up mechanism is determined by the displacement of the metering valve 250. The follow-up piston-valve 301 is biased to a neutral position by the action of spring 306 so that when metering valve 250 moves downward, follow-up piston-valve 301 due to the pressure acting on the lower end thereof moves upward and upon valve 250 moving upward the follow-up piston-valve 301 moves downward.

When the follow-up piston-valve 301 reaches a maximum permissible travel, the fluid medium or oil is by-passed through valve opening 303 which is opened by valve member 304.

During operation when only partial movement results, the oil is by-passed through the clearance between the surface defining the valve opening 303 and the valve member 304 allowing the follow-up piston valve 301 to be returned to a neutral position under the biasing force of spring 306.

When a great increase in the intake manifold pressure is required, the metering valve 250 will be subjected to a high pressure differential by the servo valve 103 and the metering valve will move downward rapidly causing the follow-up piston-valve 301 to move upward to its full extent. The latter action will not only open valve 303 but will also open the ports in the valve chamber 300A leading to the passages 270 and 271 to the pressure medium supplied the valve chamber 300A by passage 82 so as to permit the pressure medium to be valved into the high and low speed coupling passages 270 and 271 respectively to provide acceleration of the couplings 39 and 51.

The follow-up action of the piston-valve 301 is transmitted by links 315 to follow-up lever 186. Follow-up lever 186 is pivotally supported by pin 185 which is freely rotatable in the tubular member 184 and lever 182. The follow-up lever 186 has the link 187 eccentrically connected thereto so as to transmit the motion of the follow-up lever 186 to the selector whiffletree beam 135. Thus upon the metering valve 250 moving downward to increase the manifold pressure, the follow-up piston valve 301 moves upward causing the follow-up lever 186 to move in a clockwise direction about the pin 185 and moving the whiffletree selector beam 135 in a counterclockwise direction about the pin 146 so as to decrease the pressure setting. Likewise upon the metering valve 250 moving in an upward direction to decrease the manifold pressure, the follow-up lever is moved so as to increase the pressure setting thereby providing novel follow-up action for preventing instability of the control unit A.

The foregoing novel follow-up means has been described and claimed in Patent No. 2,678,642.

*Operation*

It will be seen from the foregoing that there is provided a novel hydraulically operated control unit including a main control lever 3 and cruise override control lever 152. In addition there are provided the lever 61 for controlling the carburetor throttle 59 and a pulley 17 for connection to the propeller governor.

Movement of the main control lever 3 operates the propeller governor pulley 17 through a linkage mechanism 5 and positions the pulley 17 mechanically to the required speed setting. At the same time a cam 136 sets the pressure controlling element 133 to the desired intake manifold pressure, while a second cam 198 sets the altitude droop mechanism 170 so as to correct for droop in such intake manifold pressure due to change in the altitude of the aircraft. Further a linkage positions the throttle 59 through operation of the throttle servo valve 103 and piston 64 to a predetermined open position.

In the automatic operating range of the unit (above the idling pressure range determined by bellows stem 128) the throttle opening will not be sufficient to provide the manifold pressure selected. Consequently the throttle actuating servo 64 automatically opens the throttle 59 further to give the selected pressure. At a given position of the main control lever 3 the pressure and engine speed will be kept constant within the limitations of altitude and the variations provided by the altitude droop mechanism 170. Thus the main control lever 3 provides correlated selection of manifold pressure and engine speed.

The cruise override control 152 forming the subject matter of the present application permits variation of the manifold pressure selection in the cruising range of pressures to provide maximum fuel economy for long range cruising. When the cruise override bell crank 135 is moved in a counterclockwise direction, the pressure selection throughout the entire movement of the pilot's control is set below a predetermined value. This serves to lock the unit into manual operation through the effect of the limit stem 128 so as to permit ground checking of magnetos and reduction of selected pressure in an emergency, where it is desired to keep engine speed selection to a high value.

The engine power control A is arranged for operation with a variable speed supercharger drive including high and low speed hydraulic drives 39 and 51 respectively. The engine power control provides automatic control of the drive by operation of a flow control valve 250. In maintaining automatic control of the manifold pressure when the throttle 59 reaches the wide open position, the flow control valve 250 is adjusted by increased hydraulic pressure so as to cause the supercharger speed to increase until the selected manifold pressure is reached.

It should be further noted that when hydraulic pressure is available, the throttle is positioned by the hydraulic servo piston 64 even in the manual range.

Thus upon manual adjustment of the shaft 4 in a counterclockwise direction past a predetermined critical low pressure setting position, the cam 136 positions the pin 134 so that the valve stem 103 is raised above its neutral position, while the pin 128 locks the bellows 126 out of operation in a pressure decreasing direction and is thus ineffective for returning the valve stem 103 to a neutral position.

The latter upward adjustment of the valve stem 103 opens port 66 to the pressure medium supplied through line 82 so that pressure is applied to piston 64 at the upper side tending to move piston 64 in a downward direction and actuating arm 69 in a counterclockwise direction. Such counterclockwise movement of arm 69 adjusts throttle arm 61 in a throttle closing direction and acts through interconnecting linkages 73, 72 and 71 so as to move arm 74 in a clockwise direction and thereby actuate the plunger 100 downward to return the valve stem 103 to a neutral position.

Further, manual adjustment of the shaft 4 and the arm 70 in a counterclockwise direction causes the arm 74 to be moved in a counterclockwise direction so that plunger 100 releases valve stem 103 whereupon leaf spring 104 raises the same so as to permit the pressure medium to be applied to the upper side of piston 64 causing further counterclockwise movement of the arm 69 so that the arm 74 resets the valve stem 103 to a neutral position and effects further adjustment of the throttle arm 61 in a valve closing direction.

Of course, upon manual adjustment of the arm 70 within the automatic lock out range in a clockwise direction, there will be effected a clockwise movement of arm 74 past the critical neutral position causing valve stem 103 to be lowered whereupon piston 64 will actuate arm 69 in a clockwise direction moving arm 74 in a counterclockwise direction so that the valve stem 103 will be returned to a neutral position and the throttle arm 61 adjusted in a valve opening direction. Upon the shaft 4 being adjusted in a clockwise direction past the limit of the automatic lock out range, the mechanism will once again be placed in automatic operation controlled by the pressure selector cam 136.

In the event of a hydraulic pressure failure, the novel manually operable mechanical linkage 70, 71, 72, 73 and 74 is arranged so as to provide direct manual throttle control as heretofore explained. This linkage is particularly effective at the time of starting the aircraft engine. The manual throttle travel is sufficient to give normal power at take-off engine speed at sea level.

During normal operation of the engine the cruise override control 150 will be kept at its neutral position and both engine speed and manifold pressure will be controlled and selected together by the single pilot's control lever 1.

Constant manifold pressure and engine speed will be obtained at fixed pilot's control lever 1 positions up to critical altitude except as limited by the novel altitude droop device 170 and as momentarily effected by the novel follow-up device 300. The altitude droop mechanism serves to prevent the intake manifold pressure obtained through the control of the supercharger speed and throttle valve from exceeding values required for the safe operation of the engine at the prevailing altitude of the aircraft.

Although only one embodiment of the invention has been described and illustrated in detail, it is to be expressly understood that the same is not limited thereto. Various changes may be made in design and arrangement of the parts illustrated, as will be apparent to those skilled in the art. For a definition of the limits of the invention, reference should be had to the appended claims.

What is claimed is:

1. An engine control system comprising pilot operative means for selecting a desired manifold pressure for the engine, means for controlling the manifold pressure, manifold pressure responsive means for adjusting said control means so as to maintain the selected manifold pressure, atmospheric pressure responsive means to decrease the selected manifold pressure with increase in altitude, a cam operatively connected to and adjustably positioned by said atmospheric pressure responsive means, a follower for said cam, means operably connecting said atmospheric pressure responsive means through said follower to the selecting means, and means connecting said follower to said pilot operative means so as to vary the position of said follower relative to said cam upon a change in the selected manifold pressure so that the correction imparted to the selecting means by said atmospheric pressure responsive means will be dependent upon the pilot selected manifold pressure.

2. The combination defined by claim 1 including a second cam connected to said pilot operative means and arranged to vary the position of said follower relative to said first mentioned cam upon a change in the selected manifold pressure.

3. For use with an internal combustion engine having an induction passage provided with a supercharger and a hydraulic coupling for transmitting a driving force to said supercharger at variable ratios of engine-to-supercharger speed, a power control device provided with a flow channel for conducting hydraulic fluid to said coupling, a flow metering valve, said channel having a fluid inlet and a fluid outlet controlled by said metering valve, means for actuating said valve as a function of induction pressure to move the valve to different flow-regulating positions and establishing a definite fluid flow from said fluid outlet to said coupling calibrated to maintain a predetermined supercharger speed for a given induction pressure, reducing valve means to provide a predetermined minimum fluid pressure to said fluid inlet, and means operatively connecting said reducing valve means to said fluid outlet so as to compensate the fluid inlet for changes in back pressure at said fluid outlet.

4. For use with an internal combustion engine having an induction passage provided with a supercharger and a hydraulic coupling for transmitting a driving force to said supercharger at variable ratios of engine-to-supercharger speed, a power control device provided with a flow channel for conducting hydraulic fluid to said coupling, a flow metering valve, said channel having a fluid inlet and a fluid outlet controlled by said metering valve, means for actuating said valve as a function of induction pressure to move the valve to different flow-regulating positions and establishing a definite fluid flow from said fluid outlet to said coupling calibrated to maintain a predetermined supercharger speed for a given induction pressure, and valve means to control the fluid pressure to said inlet in response to a fluid inlet and outlet pressure differential.

5. The combination defined by claim 4 in which said valve means includes a spring to bias said valve means in an inlet opening direction in opposition to said inlet pressure to increase the fluid inlet pressure.

6. For use with an internal combustion engine having an induction passage provided with a supercharger and a plurality of hydraulic couplings for selectively transmitting a driving force to said supercharger at variable ratios of engine-to-supercharger speed, power control mechanism including means for regulating the flow of hydraulic fluid to said couplings comprising a metering valve, a fluid pressure inlet orifice and a series of fluid pressure metering outlet orifices controlled by said valve in sequential order as the valve moves toward open and closed position to selectively affect said couplings, hydraulic means for operating said valve including a fluid actuated piston, a servo valve controlling flow of operating fluid to said piston, a device responsive to changes in induction pressure, an operating connection between said device and said servo valve for operating said metering valve, a reducing valve to regulate the fluid pressure to said inlet orifice, and a shuttle valve to selectively connect said reducing valve to one of said fluid outlet orifices to compensate the fluid inlet for changes in back pressure at said one fluid orifice.

7. For use with an internal combustion engine having an induction passage provided with a supercharger and a hydraulic coupling for transmitting a driving force to said supercharger at variable ratios to engine-to-supercharger speed, a power control device provided with a flow channel for conducting hydraulic fluid to said coupling, a flow metering valve in said channel, means for actuating said valve as a function of induction pressure to move the valve to different flow-regulating positions and establish a definite fluid flow to said coupling calibrated to maintain a predetermined supercharger speed for a given induction pressure, a feed port in said channel on the discharge side of said valve, and means for maintaining a substantially constant pressure drop across said port.

8. For use with an internal combustion engine having an induction passage provided with a supercharger and a hydraulic coupling for transmitting a driving force to said supercharger at variable ratios of engine-to-supercharger speed, power control mechanism including means for regulating the flow of hydraulic fluid to said coupling comprising a metering valve and a series of metering orifices controlled by said valve in sequential order as the valve moves towards open and closed position, hydraulic means for operating said valve including a fluid-actuated piston, a servo valve controlling flow of operating fluid to said piston, variable datum means including a device responsive to changes in induction pressure, an operating connection between said device and said servo valve for operating said metering valve, a conduit having a discharge port therein communicating the discharge side of said metering valve with said coupling, and means for maintaining a constant pressure drop across said port.

9. A system of control for a supercharged internal combustion engine comprising, in combination, a throttle valve controller having datum adjusting means providing for selection of an engine intake pressure to be maintained and means under control by intake pressure and by said datum adjusting means for so positioning the engine throttle valve as to obtain the selected pressure, a control lever for operating the datum adjusting means, a supercharger connected with the engine intake, variable speed means for driving the supercharger including a hydraulic coupling for transmitting a driving force to said supercharger at variable ratios of engine-to-supercharger speed, a power control device provided with a flow channel for conducting hydraulic fluid to said coupling, a flow metering valve, said channel having a fluid inlet and a fluid outlet controlled by said metering valve, means for actuating said valve as a function of the engine intake pressure to move the metering valve to different flow-regulating positions and establishing a definite fluid flow from said fluid outlet to said coupling calibrated to maintain a predetermined supercharger speed for a given intake pressure, reducing valve means to provide a predetermined minimum fluid pressure to said fluid inlet, means operatively connecting said reducing valve means to said fluid outlet so as to compensate the fluid inlet for changes in back pressure at said fluid outlet, and altitude pressure responsive means normally operative to limit the speed obtained by operation of the flow metering valve and the pressure obtained by operation of the valve controller to values required at varying altitudes for safe operation of the engine.

10. A system of control for a supercharged internal combustion engine comprising, in combination, a throttle valve controller having datum adjusting means providing for selection of an engine intake pressure to be maintained and means under control by intake pressure and by said datum adjusting means for so positioning the engine throttle valve as to obtain the selected pressure, a control lever for operating the datum adjusting means, a supercharger connected with the engine intake, variable speed means for driving the supercharger including a plurality of hydraulic couplings for selectively transmitting a driving force to said supercharger at variable ratios of engine-to-supercharger speed, power control mechanism including means for regulating the flow of hydraulic fluid to said couplings comprising a metering valve, a fluid pressure inlet orifice and a series of fluid pressure metering outlet orifices controlled by said valve in sequential order as the valve moves toward open and closed position to selectively affect said couplings, hydraulic means for operating said valve including a fluid actuated piston, a servo valve controlling flow of operating fluid to said piston, a device responsive to changes in the engine intake pressure, an operating connection between said device and said servo valve for operating said metering valve, a reducing valve to regulate the fluid pressure to said inlet orifice, a shuttle valve to selectively connect said reducing valve to one of said fluid outlet orifices to compensate the fluid inlet for changes in back pressure at said one fluid orifice and altitude pressure responsive means normally operative to limit the speed obtained by operation of the speed changing element and the pressure obtained by operation of the valve controller to values required at varying altitudes for safe operation of the engine.

11. The combination defined by claim 10 in which said altitude pressure responsive means includes atmospheric pressure responsive means, a cam operatively connected to and adjustably positioned by said atmospheric pressure responsive means, a follower for said cam, means operably-connecting said atmospheric pressure responsive means through said follower to the datum adjusting means so as to cause an adjustment of the datum adjusting means to decrease the engine intake pressure with increase in altitude and means connecting said follower to said control lever so as to vary the position of said follower relative to said cam upon a change in the selected engine intake pressure so that the adjustment imparted to the datum adjusting means by said atmospheric pressure responsive means will be dependent upon the selected engine intake pressure.

12. For use in controlling the power output of an internal combustion engine; the combination comprising a main control member, means controlled by said main control member for variably regulating the intake manifold pressure, means also controlled by said main control member for variably regulating the engine speed to maintain a definite schedule of power output; one of said regulating means including means for modifying said definite power output schedule independently of said main control member, said last mentioned means including a cam adapted to be positioned by said main control member, a cam follower, a selector plate to vary the setting of said regulating means and pivotally connected to said cam follower, a spring to bias said cam follower into contacting relation with said cam and selector plate so as to vary the position of said plate in accordance with said cam, and an auxiliary control member to actuate said selector plate out of contacting relation with said cam follower for modifying the setting of said one regulating means independently of the position of said main control member.

13. For use in controlling the power output of an internal combustion engine; the combination comprising a main control member, means controlled by said main control member for variably regulating the intake manifold pressure, means also controlled by said main control member for variably regulating the engine speed to maintain a definite schedule of power output; one of said regulating means including means for modifying said definite power output schedule independently of said main control member, said last mentioned means including a cam adapted to be positioned by said main control member, a cam follower, a selector plate to vary the setting of said regulating means and pivotally connected to said cam follower, a spring to bias said cam follower into contacting relation with said cam and selector plate so as to vary the position of said plate in accordance with said cam, an auxiliary control member to actuate said cam follower out of contacting relation with said cam for modifying the setting of the regulating means independently of the position of the main control member, and means adapted to be positioned by said main control member to actuate said selector plate out of contacting relation with said cam follower for varying the setting of said regulating means independently of said auxiliary control member upon the main control member being adjusted to a predetermined position.

14. For use in controlling the power output of an internal combustion engine; the combination comprising a main control member, means controlled by said main control member for varibly regulating the intake manifold pressure, means also controlled by said main control member for variably regulating the engine speed to maintain a definite schedule of power output; one of said regulating means including means for modifying said definite power output schedule independently of said main control member, said last mentioned means including a cam adapted to be positioned by said main control member, a cam follower, a selector plate to vary the setting of said regulating means and pivotally connected to said cam follower, a spring to bias said cam follower into contacting relation with said cam and selector plate so as to vary the position of said plate in accordance with said cam, an auxiliary control member movable in one direction from a normal position to actuate said selector plate out of contacting relation with said cam follower to decrease one of the power output factors to a value below the normal schedule, and said auxiliary control member movable in an opposite direction from the normal position into contacting relation with said cam follower and to actuate said cam follower out of contacting relation with said cam to increase one of the power output factors to a value above the normal schedule.

15. The combination defined by claim 14 including means actuated by movement of the main control member to a certain low pressure position to actuate said selector plate out of contacting relation with said cam follower for varying the setting of the regulating means, while the auxiliary control member remains in the power output factor increasing position.

16. The combination defined by claim 14 in which said cam has a cam surface effective upon movement of the main control member to a certain high pressure position to actuate said cam follower out of contacting relation with said auxiliary control member for varying the setting of the regulating means while the auxiliary control member remains in the power output factor increasing position.

17. For use with an aircraft engine having an air intake system provided with a variable speed supercharger and a hydraulic coupling for transmitting a driving force to said supercharger; an automatic regulator including a valve for regulating a flow of hydraulic fluid to said coupling and thereby the speed of said supercharger, first pressure responsive bellows and a passage through which the first bellows may be subjected to the engine air intake pressure, second pressure responsive bellows and a passage through which the second bellows may be subjected to a pressure which tends to vary with changes of altitude, third pressure responsive means and a passage through which the third means may be subjected to a pressure which tends to vary during changes in the pressure of the coupling fluid, and servomotor means under the control of said first and second pressure responsive bellows and said third pressure responsive means for actuating said flow regulating valve.

18. The combination defined by claim 17 including a manually actuated control lever, and means operated by said control lever for varying the setting of said first and second pressure responsive bellows.

19. The combination defined by claim 17 including a second servomotor means under the control of said first and second pressure responsive bellows and said third pressure responsive means for actuating a throttle valve in the air intake system to regulate the air intake pressure to the engine.

20. For use with an aircraft engine having an air intake system provided with a variable speed supercharger and a hydraulic coupling for transmitting a driving force to said supercharger, an automatic control device including an adjustably positioned valve for regulating the flow of hydraulic fluid to said coupling and thereby the speed of said supercharger, engine air intake pressure responsive means, additional pressure responsive means sensing changes of a pressure tending to vary with the altitude, third means becoming operative during adjustment of the position of the coupling fluid regulating valve, and power means controlled by said three means to adjustably position said coupling fluid regulating valve.

21. For use with an aircraft engine having an air intake system including a throttle valve for controlling the engine air intake pressure, a variable speed supercharger, a hydraulic coupling for transmitting a driving force to said supercharger, and means for regulating the supply of hydraulic fluid to the coupling and thereby the speed of said supercharger; an automatic control device including engine air intake pressure responsive means, additional pressure responsive means sensing changes of a pressure tending to vary with the altitude, third pressure responsive means becoming operative during changes in the supply of hydraulic fluid to the coupling, and power means controlled by said three means to position the throttle valve and the means for regulating the supply of hydraulic fluid to the coupling so as to maintain a required engine air intake pressure under prevailing operating conditions of the aircraft.

22. For use with an aircraft engine having a combustion chamber, an air intake passage leading combustion air to the combustion chamber, and a fuel supply system; an automatic control device for regulating the air intake pressure to said combustion chamber, said control device including first pressure responsive means, a passage for connecting the first pressure responsive means with said air intake passage, second pressure responsive means, a passage for subjecting said second means to a pressure tending to vary with the altitude, third pressure responsive means, a passage for subjecting said third means to a pressure which tends to vary during changes in the air intake pressure to the combustion chamber, and power means controlled by said three pressure responsive means to regulate the air intake pressure to said combustion chamber.

23. For use with an aircraft engine; an automatic control device including engine manifold pressure responsive means; additional pressure responsive means sensing changes of a pressure which varies with the altitude of the aircraft, third means actuated upon changes in the engine manifold pressure, regulating means for controlling the engine manifold pressure, and an operative connection including floating levers and a hydraulic power system to actuate said regulating means from said manifold pressure responsive means, additional pressure responsive means and said third means.

24. For use with an aircraft engine having an air induction passage and a fuel supply system; the combination comprising a power system for variably regulating the air induction pressure, first pressure responsive means adapted for connection with said air induction passage to be constantly exposed to the pressure therein, second pressure responsive means for sensing changes of a pressure tending to vary with the altitude, third means actuated during changes in the air induction pressure, and an operative connection between said first, second and third means and said power system for actuating the latter to alter the engine air induction pressure automatically in predetermined relation to said first, second and third means.

25. Control apparatus for controlling the pressure maintained in the fuel mixture intake of a supercharged internal combustion aircraft engine, said apparatus comprising, in combination, a pressure selecting means, an element responsive to engine intake pressure, motor means for controlling the intake pressure, said motor means under joint control by said element and said pressure selecting means, adjustable means for modifying the pressure selected by the pressure selecting means, means for limiting the selected pressure range of the pressure selecting means, a pilot's first manual control adjustable during flight of the aircraft, means operatively connecting said first control to said pressure selecting means, a pilot's second manual control adjustable during flight of the aircraft, means operatively connecting said second control to said pressure modifying and limiting means for adjusting the modifying and limiting effects thereof, and a pressure responsive means becoming operative during changes in the intake pressure tending to momentarily reset the selected pressure in a sense opposite to the change in intake pressure as the intake pressure approaches the selected value.

26. For use with a variable speed blower for an internal combustion engine, a blower speed controller comprising a servo-motor for operating a speed varying element, a member for controlling the servo-motor, and apparatus for effecting a joint control of said member and including a manually positioned blower-outlet-pressure-selecting cam, a bellows responsive to blower-outlet-pressure, a bellows responsive to a pressure which tends to vary with changes of altitude, a pressure responsive device momentarily responsive to changes in the blower-outlet-pressure, and a floating lever means operatively connecting said cam, first and second mentioned bellows and said last mentioned device to said control member, and manually operated means coordinated with the manual positioning of the cam for determining the altitude pressure at which the last named bellows becomes effective to control said member.

27. For use with a variable speed blower for an internal combustion engine, a blower speed controller comprising a servomotor for operating a speed varying element, a part for controlling the servomotor, an apparatus for effecting a joint control of said part and including a manually positioned blower outlet pressure selecting cam, a first means responsive to blower outlet pressure, a control lever connected with the first means and with the part, a second means responsive to a pressure which tends to vary with changes in altitude, a third means responsive to changes in blower outlet pressure, a floating lever operatively connecting said second and third means to said control lever, and a cam follower engageable with the cam and connected with the floating lever.

28. A pressure regulator for supercharged internal combustion engines comprising a servomotor, means for connecting the servomotor with a means for regulating the air intake pressure of the engine, a manually operated cam for selecting a pressure to be maintained, a device responsive to engine intake pressure, means under the control of the cam and under the control of the pressure responsive device for controlling the servomotor, means responsive to altitude change and operating, when an altitude is reached at which engine detonation would occur at the pressure selected by the cam, for modifying the selected pressure to a safe value, and means becoming operative during changes in the air intake pressure tending to momentarily reset the selected pressure value in a sense opposite to the change as the air intake pressure approaches the value to be maintained.

29. Apparatus for controlling the intake pressure of a supercharged internal combustion engine comprising a member for actuating means for regulating the engine air intake pressure, a servomotor for operating said member, a first device responsive to altitude pressure, an element responsive to engine intake pressure, a manually operable part, pressure selecting means operated by said part, means controlled by said first device for modifying the action of the pressure selecting means so as to limit the obtainable pressure to a value less than can be demanded by manual operation, a second device responsive to a pressure tending to change with engine intake pressure, said second device operatively connected to said modifying means so as to momentarily reset the pressure selecting means upon change in the engine intake pressure in a sense opposite to said changes, and means under control by said element and by said pressure selecting means for controlling the servomotor.

30. A pressure regulator for supercharged internal combustion engines, comprising control means movable to different positions to regulate the pressure maintained in the fuel induction conduit of said engine, a member movable to different positions to select different pressures to be maintained, automatic means controlled by variations in pressure in the induction conduit and operable to move the control means so as to maintain any pressure selected by said selector member, first means operable automatically and independently of the selector member for modifying the action of the automatic means when operating conditions are such as would cause detonation so that the pressure maintained by said automatic means will be within a safe operating range and less than that selected by said selector member, and second means operable automatically during changes in the induction pressure to modify the selected pressure value momentarily in a sense opposite to the change in the induction pressure.

31. A pressure regulator for supercharged internal combustion engines, comprising control means movable to different positions to regulate the pressure maintained in the fuel induction conduit of said engine, a member movable to different positions to select different pressures to be maintained, automatic means controlled by variations in pressure in the induction conduit and operable to move the control means so as to maintain any pressure selected by said selector member, and automatic mechanism independent of the selector member for modifying the action of the automatic means, said mechanism including first means effective when operating conditions are such as would cause detonation if pressures above a certain maximum are maintained, to prevent the maintenance of pressures above such maximum regardless of the pressure selected, and second means becoming operative during changes in induction pressure tending to momentarily reset the selected pressure in a sense opposite to such change.

32. Apparatus for controlling the intake pressure of a supercharged internal combustion engine, comprising a member for actuating a throttle valve in the engine induction passage, a servomotor for operating said member, a device responsive to altitude pressure, a device momentarily operative during changes in the engine intake pressure, a manually positioned part, pressure selecting means under control by said devices and part, an element responsive to engine intake pressure, and means under control by the pressure selecting means and by the element for controlling the servomotor.

33. Apparatus for controlling the intake pressure of a supercharged internal combustion engine comprising a member for actuating a throttle valve in the engine induction passage, a servomotor for operating said member, a device responsive to altitude pressure, an element responsive to engine intake pressure, a manually operable part, pressure selecting means operated by said part, means controlled by said device for modifying the action of the pressure selecting means so as to limit the obtainable pressure to a value less than can be demanded by manual operation, a second device momentarily operative during changes in the engine intake pressure for varying the modifying action of the device first mentioned, and means under control by said element and by said pressure selecting means for controlling the servomotor.

No references cited.